(12) United States Patent
Bean et al.

(10) Patent No.: US 6,836,292 B2
(45) Date of Patent: Dec. 28, 2004

(54) CONDUCTIVELY COATED AND GROUNDED OPTICS TO ELIMINATE DIELECTRIC DUST ATTRACTION

(75) Inventors: Heather Noel Bean, Fort Collins, CO (US); Mark Nelson Robins, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 754 days.

(21) Appl. No.: 09/872,467

(22) Filed: Jun. 1, 2001

(65) Prior Publication Data

US 2002/0180880 A1 Dec. 5, 2002

(51) Int. Cl.[7] .............................................. G02B 13/16
(52) U.S. Cl. ..................................... 348/335; 348/375
(58) Field of Search .................................. 348/373, 374, 348/375, 340, 335; 359/608; 396/448; 438/116

(56) References Cited

U.S. PATENT DOCUMENTS

| 3,801,418 | A | | 4/1974 | Cornelis et al. ............... 161/43 |
|---|---|---|---|---|
| 3,949,131 | A | | 4/1976 | Fraser ....................... 428/201 |
| 4,632,527 | A | * | 12/1986 | Masso et al. ................ 351/166 |
| 4,745,518 | A | | 5/1988 | Fang .......................... 361/220 |
| 4,831,491 | A | | 5/1989 | Mueller et al. .............. 361/218 |
| 5,223,765 | A | | 6/1993 | Staron et al. ................ 313/478 |
| 5,450,277 | A | * | 9/1995 | Wescott et al. ............. 361/220 |
| 5,721,299 | A | | 2/1998 | Angelopoulos et al. ...... 524/177 |
| 6,327,085 | B1 | * | 12/2001 | Osawa et al. ................ 359/495 |
| 6,387,844 | B1 | * | 5/2002 | Fujishima et al. ........... 502/350 |
| 2002/0068156 | A1 | * | 6/2002 | Suzuki et al. ................ 428/208 |

FOREIGN PATENT DOCUMENTS

| JP | 2000029132 A | * | 1/2000 | ........... G03B/19/20 |
|---|---|---|---|---|
| JP | 2001298640 A | * | 10/2001 | ........... H04N/5/225 |

* cited by examiner

Primary Examiner—Aung Moe
Assistant Examiner—Jacqueline Wilson

(57) ABSTRACT

An electrostatic discharge apparatus and method for a lens of a hand-held imaging device are provided according to the invention. The electrostatic discharge apparatus includes a main body and an optical lens mounted on the main body. A transparent conductive coating is formed on the optical lens. The device further includes a conductive pad formed on the main body. The conductive pad is in electrical contact with the transparent conductive coating. The conductive pad is located on the main body at a region contacted by a user during use of the hand-held imaging device.

20 Claims, 2 Drawing Sheets

CONDUCTIVELY COATED AND GROUNDED OPTICS TO ELIMINATE DIELECTRIC DUST ATTRACTION

FIELD OF THE INVENTION

The present invention relates generally to electronic imaging devices, and more particularly to an electrostatic discharge apparatus and method of discharging electrostatic charge for an optical lens.

BACKGROUND OF THE INVENTION

Hand-held imaging devices are quite common and generally are used to capture either still or video images. Hand-held imaging devices may include analog and digital still cameras and video cameras, for example. These devices have one thing in common: they employ a lens or lens apparatus used to capture an image by focusing light from an object or scene onto a light sensitive imaging material.

A problem encountered in all such imaging devices is the dust that is present in the atmosphere. The majority of atmospheric dust is dielectric in nature. Therefore, dust is attracted to charge objects of both positive and negative polarities. As a result, it may be attracted to and cling to a lens of an imaging device if the lens has any level of electrostatic charge. The problem is greater in hand-held imaging devices because the lenses of such devices do not have a highly conductive or permanent connection to ground. This is in contrast to AC-powered devices, such as desktop computer devices, for example, wherein an electrostatic discharge path is available in an alternating current (AC) ground connection.

The dust or other particulate matter may interfere with image capture and may degrade the image. Dust may cause blurring, distortion, dark spots, etc., in a captured image. In addition, the dust and other particulate matter can damage or scratch the lens if removed improperly. Most image devices instruct a user to remove the dust with a cleaning fluid and a soft cloth. However, the user must be careful not to grind the dust against the lens surface and cause scratching or other damage.

In the prior art, efforts at dust prevention on lens surfaces has been very basic. Generally, a user puts a lens cap on the lens apparatus when not in use. The lens cap prevents dust build up on the surface of the lens. The other prior art approach is to clean the lens frequently to prevent the build up of dust and other particles.

However, the prior art approaches have drawbacks. The first drawback is that the user must remember to put on the lens cap when finished using the device. In addition, the user must remember to clean the lens at proper intervals in order to remove dust and prevent dust build-up. Furthermore, the lens cleaning of the prior art may still scratch or otherwise damage lenses. Moreover, in high dirt conditions it may be impractical to clean the lens frequently enough to prevent build up and/or damage.

Therefore, there remains a need in the art for improvements in apparatus and methods for preventing electrostatic dust accumulation on the lenses of electronic imaging device and preventing damage to such lenses caused by improper cleaning.

SUMMARY OF THE INVENTION

A hand-held imaging device is provided according to one embodiment of the invention. The hand-held imaging device comprises a main body and an optical lens mounted on the main body. The device further comprises a transparent conductive coating formed on the optical lens. The device further comprises a conductive pad formed on the main body, with the conductive pad being in electrical contact with the transparent conductive coating. The conductive pad is located on the main body at a region contacted by a user during use of the hand-held imaging device.

A hand-held imaging device is provided according to another embodiment of the invention. The hand-held imaging device comprises a main body and an optical lens mounted on the main body. The device further comprises a transparent conductive coating formed on the optical lens. The device further comprises a conductive path formed on the main body, with the conductive path being in electrical contact with the transparent conductive coating. The device further comprises a conductive pad formed on the main body, with the conductive pad being in electrical contact with the conductive path. The conductive pad is located on the main body at a region contacted by a user during use of the hand-held imaging device.

An electrostatic discharge method for a lens of a hand-held imaging device also is provided according to another embodiment of the invention. The electrostatic discharge method comprises the steps of providing a transparent conductive coating formed on the lens, providing a conductive pad formed on the hand-held imaging device and communicating with the transparent conductive coating, and locating the conductive pad on a region of the hand-held imaging device that a user contacts in order to hold or operate the hand-held imaging device.

DETAILED DESCRIPTION

Figure 1:
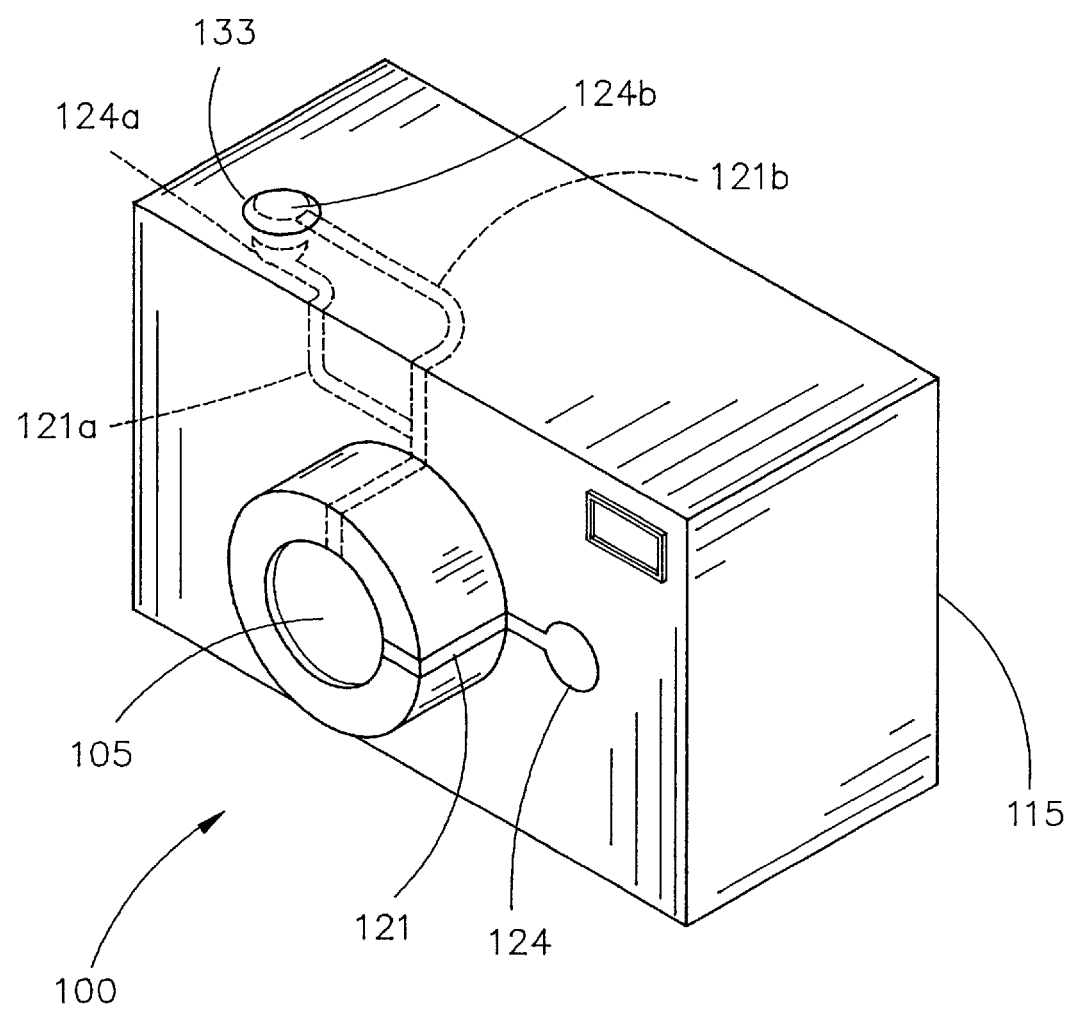
FIG. 1 shows an electrostatic discharge apparatus for a hand-held imaging device.

FIG. 1 shows an electrostatic discharge apparatus for a hand-held imaging device 100. The hand-held imaging device 100 may be any type of hand-held imaging device incorporating a lens, such as an analog or digital still camera or video camera, for example. The hand-held imaging device 100 includes a lens 105 and a body 115. The lens 105 according to the electrostatic discharge apparatus of the invention is coated with a transparent conductive coating. The electrostatic discharge apparatus also includes an optional conductive path 121 and a conductive pad 124. The conductive path 121 and pad 124 are in electrical communication with the transparent conductive coating on the lens 105.

When a user contacts the conductive pad 124, any accumulated electrostatic charge on the lens 105 is conducted away from the lens 105 and to earth ground through the user. The conductive path 121 and pad 124 are necessary because the hand-held camera 100 has no direct connection to ground, such as is present in a device that is plugged into an alternating current (AC) power source, i.e., typical 110 volt wiring that includes a wire connection to ground. Therefore, the typical hand-held imaging device 100 has no convenient or permanent ground connection and the electrostatic discharge apparatus of the invention provides an efficient, practical, and effective electrostatic discharge path.

The transparent conductive coating may be formed of any type of conductive transparent material, such as indium tin oxide, tin oxide, indium oxide, antimony-doped tin oxide, tin-doped indium oxide, and other variants. In addition, it may be a thinly deposited metal, such as gold, that may be deposited thinly enough to be transparent. The transparent conductive coating may be formed on the lens 105 in any manner, such as by spraying, vapor deposition, sputtering, etc., or may be formed on a flexible film adhered to the lens 105.

The conductive path 121 and pad 124 are preferably formed of a conductive metal, such as aluminum, copper, etc. The conductive path 121 and pad 124 therefore are capable of conducting the electrostatic charge away from the lens 105.

The conductive pad 124 is preferably located on a camera region that a user contacts in order to hold or operate the hand-held imaging device 100. In one embodiment, the pad 124 is located in a grip area as shown. The grip area is a region where the user holds the hand-held imaging device 100. The grip area may include grip devices, such as ridges, bumps, compressible pads, indentations, etc., that guide the user to place his or her fingers in a certain position. Therefore, when the user is holding the hand-held imaging device 100, the user will likely be in contact with the conductive pad 124.

In another embodiment, the pad 124a is located adjacent to an input device 133 on the hand-held imaging device 100. This alternate embodiment of the conductive path 121a and pad 124a is shown by dashed lines. The input device 133 may be any type of button, switch, etc., that is capable of being manipulated by the user to operate the hand-held imaging device 100. This may include displaceable input devices (switches, buttons, etc.), pressure sensitive input devices, etc. For example, in a camera the input device 133 may be a shutter button, a play button, a power button, a zoom button, a mode button, etc.

In another alternate embodiment, the conductive pad 124b is located on the input device 133. This alternate embodiment of the conductive path 121b and pad 124b is also shown by dashed lines. Therefore, the user has no choice but to provide a path for electrostatic discharge when operating the hand-held imaging device 100.

It should be understood that alternatively the conductive pad 124 may be directly connected to the transparent conductive coating without the need for the conductive path 121. This may be done when the lens is recessed or substantially flush with the outer surface of the hand-held imaging device 100, for example. In addition, this configuration may be used when the user's hand is typically placed on or adjacent to the lens 105 (or a lens housing) when using the hand-held imaging device 100.

Figure 2:
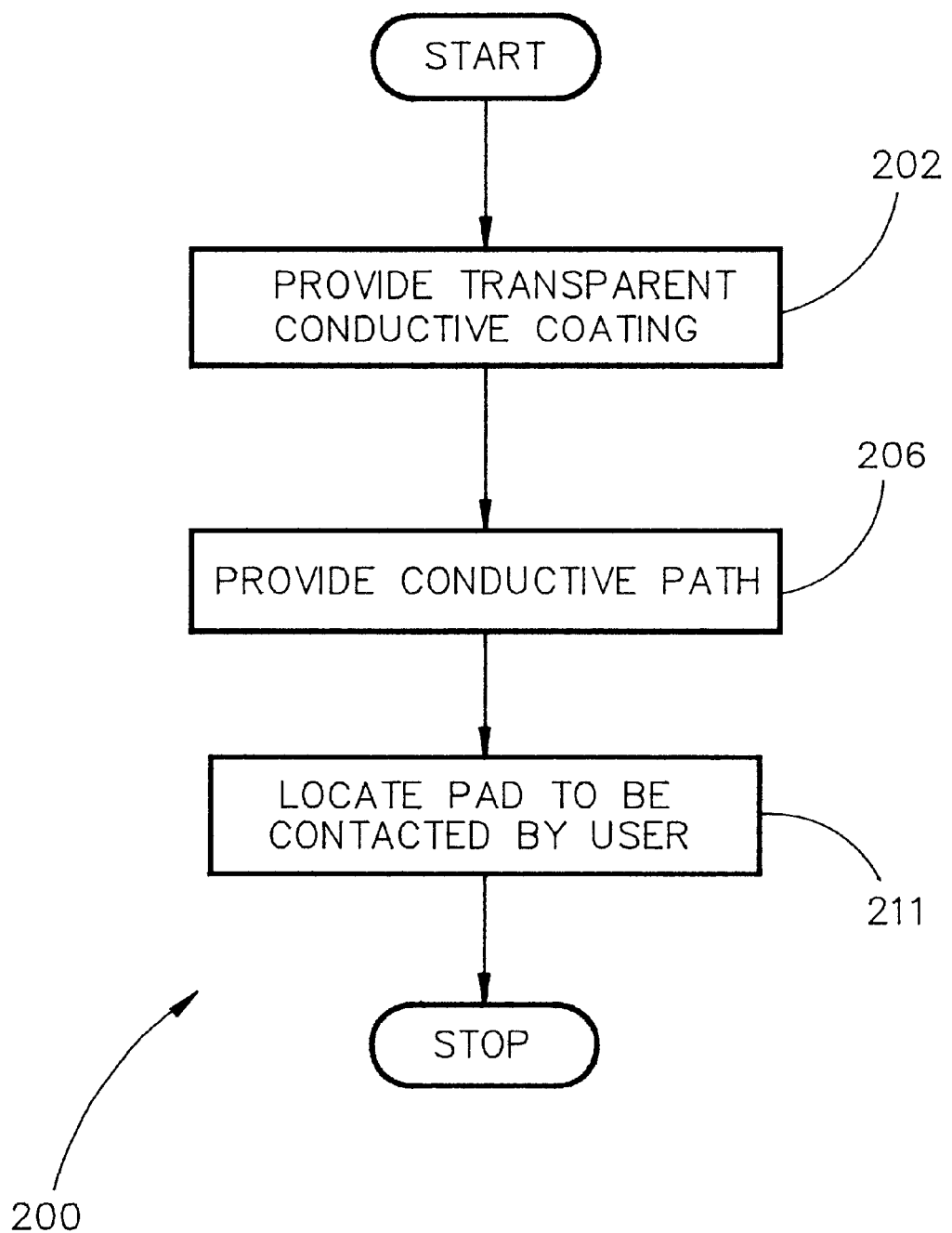
FIG. 2 is a flowchart of an electrostatic discharge method according to the invention.

FIG. 2 is a flowchart 200 of an electrostatic discharge method according to the invention. In step 202, a transparent conductive coating is provided on the lens of a hand-held imaging device. In step 206, a conductive pad is provided that is in electrical contact with the transparent conductive coating. In step 211, the conductive pad is located on a region of the hand-held imaging device that a user contacts in order to hold or operate the hand-held imaging device. In addition, a conductive path is located between and connects the transparent conductive coating and the conductive pad.

In one embodiment, the pad may be located on a grip area device. Alternatively, the pad may be located adjacent to an input device or button 133. Furthermore, the pad may be located on the input device or button 133.

The electrostatic discharge apparatus of the invention may apply to any hand-held, non-grounded imaging device that includes a lens and is susceptible to dust or particulate accumulation due to electrostatic build-up. Therefore, the electrostatic apparatus may apply to analog or digital still cameras, analog or digital video cameras, binoculars, etc.

The electrostatic discharge apparatus and method of the invention advantageously provides benefits of better images, less frequent cleaning, and less likelihood of lens damage due to cleaning or dirt build up. The electrostatic discharge apparatus and method of the invention eliminates the need for the user to remember to clean the lens and to have the proper cleaning tools and materials.

We claim:

1. A hand-held imaging device, comprising:

a main body;

an optical lens mounted on said main body;

a transparent conductive coating formed on said optical lens; and a conductive pad formed on said main body and being in electrical contact with said transparent conductive coating;

wherein said conductive pad is located on said main body at a region contacted by a user during use of said hand-held imaging device.

2. The device of claim 1, further comprising a conductive path formed between and connected to said transparent conductive coating and said conductive pad.

3. The device of claim 1, wherein said transparent conductive coating is indium tin oxide.

4. The device of claim 1, wherein said transparent conductive coating is tin oxide.

5. The device of claim 1, wherein said transparent conductive coating is indium oxide.

6. The device of claim 1, wherein said transparent conductive coating is antimony-doped tin oxide.

7. The device of claim 1, wherein said transparent conductive coating is tin-doped indium oxide.

8. The device of claim 1, wherein said transparent conductive coating is a layer of gold.

9. The device of claim 1, wherein said conductive path and said conductive pad are formed of a conductive metal.

10. The device of claim 1, wherein said conductive pad is located in a grip area on said hand-held imaging device.

11. The device of claim 1, wherein said conductive pad is located adjacent to a button of said hand-held imaging device.

12. The device of claim 1, wherein said conductive pad is located on a button of said hand-held imaging device.

13. An electrostatic discharge apparatus for a lens of a hand-held imaging device, comprising:

a main body;

an optical lens mounted on said main body;

a transparent conductive coating formed on said optical lens;

a conductive path formed on said main body and being in electrical contact with said transparent conductive coating; and a conductive pad formed on said main body and being in electrical contact with said conductive path;

wherein said conductive pad is located on said main body at a region contacted by a user during use of said hand-held imaging device.

14. An electrostatic discharge method for a lens of a hand-held imaging device, comprising the steps of:

providing a transparent conductive coating formed on said lens;

providing a conductive pad formed on said hand-held imaging device and communicating with said transparent conductive coating; and locating said conductive pad on a region of said hand-held imaging device that a user contacts in order to hold or operate said hand-held imaging device.

15. The method of claim 14, wherein the locating step comprises locating said conductive pad on a grip area of said hand-held imaging device.

16. The method of claim 14, wherein the locating step comprises locating said conductive pad adjacent to a button of said hand-held imaging device.

17. The method of claim 14, wherein the locating step comprises locating said conductive pad on a button of said hand-held imaging device.

18. The method of claim 14, wherein said conductive transparent coating, said conductive path and said conductive pad, are provided on a still camera.

19. The method of claim 14, wherein said conductive transparent coating, said conductive path and said conductive pad are provided on a video camera.

20. The method of claim 14, further comprising the step of providing a conductive path formed on said hand-held imaging device and communicating with said transparent conductive coating and with said conductive pad.

* * * * *